(12) United States Patent
McAdam et al.

(10) Patent No.: US 8,582,701 B1
(45) Date of Patent: *Nov. 12, 2013

(54) POST-DISTORTION FILTER FOR REDUCING SENSITIVITY TO RECEIVER NONLINEARITIES

(71) Applicant: PMC-Sierra, Inc., Sunnyvale, CA (US)

(72) Inventors: Matthew W. McAdam, Vancouver (CA); Anthony Eugene Zortea, Pipersville, PA (US)

(73) Assignee: PMC-Sierra, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,282

(22) Filed: Oct. 26, 2012

Related U.S. Application Data

(60) Continuation of application No. 12/985,206, filed on Jan. 5, 2011, now Pat. No. 8,300,733, which is a division of application No. 11/688,685, filed on Mar. 20, 2007, now Pat. No. 7,912,151.

(60) Provisional application No. 60/788,178, filed on Mar. 31, 2006.

(51) Int. Cl.
*H04L 27/08* (2006.01)
(52) U.S. Cl.
USPC ........................................ 375/345
(58) Field of Classification Search
USPC ........................................ 375/345
See application file for complete search history.

(56) References Cited

U.S. PATENT DOCUMENTS

| 5,107,520 | A | 4/1992 | Karam et al. |
| 5,617,450 | A | 4/1997 | Kakuishi et al. |
| 6,408,036 | B1 | 6/2002 | Wilson |
| 6,518,903 | B1 | 2/2003 | Perraud et al. |
| 7,215,972 | B2 | 5/2007 | Premakanthan et al. |
| 7,400,870 | B2 * | 7/2008 | Scheffler .................... 455/245.1 |
| 2003/0100286 | A1 | 5/2003 | Severson et al. |
| 2004/0264562 | A1 | 12/2004 | Wu et al. |
| 2006/0240786 | A1 | 10/2006 | Liu |
| 2007/0047127 | A1 * | 3/2007 | Hutchins et al. ................ 360/65 |
| 2007/0161359 | A1 | 7/2007 | McCarthy et al. |

OTHER PUBLICATIONS

Douglas, et al; Adaptive linearization of power amplifiers in digital radio systems; Signal Processing; Bell Systems Technical Journal; Apr. 1983; vol. 62, Issue 4.
Fisher, et al.; An Adaptive RAM-DFE for Storage Channels; IEEE Transactions on Communications; Nov. 1991; Volume: 39, Issue: 11.

(Continued)

*Primary Examiner* — Siu Lee
*Assistant Examiner* — Tanmay Shah
(74) *Attorney, Agent, or Firm* — Knobbe Martens Olson & Bear LLP

(57) ABSTRACT

Methods and apparatus for reducing sensitivity to nonlinearities in the receiver of a digital communications system are disclosed. One aspect can be referred to as a Post-Distortion Decision Feedback Equalizer (PDFE). A gain stage is often implemented as a variable gain amplifier (VGA), and can introduce significant nonlinearities, a problem exacerbated by signals with a large peak-to-average ratio (PAR). One embodiment provides feed forward information from the VGA regarding its status to a DFE, and the DFE adjusts its filtering based on the provided information. The advantages are also applicable to fixed-gain amplifiers and to transversal filters.

18 Claims, 7 Drawing Sheets

(56) References Cited

OTHER PUBLICATIONS

Kim, et al.; A Decision-Feedback Equalizer with Pattern-Dependent Feedback for Magnetic Recording Channels; IEEE Transactions on Communications; Jan. 2001; Volume: 49, Issue: 1.

Saleh, et al; Adaptive linearization of power amplifiers in digital radio systems; Signal Processing; Bell Systems Technical Journal; Apr. 1983; vol. 62, Issue 4.

USPTO; Office Action dated Apr. 5, 2010, from related application U.S. Appl. No. 11/688,685, filed Mar. 20, 2007.

USPTO; Office Action dated Oct. 6, 2010, from related application U.S. Appl. No. 11/688,685, filed Mar. 20, 2007.

USPTO; Office Action dated Jun. 20, 2011, from related application U.S. Patent Appl. No. 12/985,206, filed Jan. 5, 2011.

USPTO; Office Action dated Dec. 2, 2011, from related application U.S. Appl. No. 12/985,206, filed Jan. 5, 2011.

\* cited by examiner

POST-DISTORTION FILTER FOR REDUCING SENSITIVITY TO RECEIVER NONLINEARITIES

CROSS-REFERENCE TO RELATED APPLICATION

This application is a continuation application of U.S. patent application Ser. No. 12/985,206, filed Jan. 5, 2011, which is a divisional application of U.S. patent application Ser. No. 11/688,685, filed Mar. 20, 2007, which claims the benefit under 35 U.S.C. §119(e) of U.S. Provisional Application No. 60/788,178, filed Mar. 31, 2006, the disclosures of each of which are hereby incorporated by reference in their entireties herein.

BACKGROUND OF THE INVENTION

1. Field of the Invention

The invention generally relates to digital communications. In particular, the invention relates to filtering techniques in a receiver.

2. Description of the Related Art

The performance of digital communication systems can be measured in terms of Bit Error Rate (BER). Two common blocks found in digital receivers are: Decision Feedback Equalizers (DFEs) and Variable Gain Amplifiers (VGAs). Some features of both blocks will be discussed in this section.

A common type of nonlinearity encountered in practical amplifiers is compression, as depicted in FIG. 1. In FIG. 1, it can be seen that as input power increases, output power eventually saturates. This is referred to as gain compression. The 1 decibel (decision block) compression point (a commonly applied metric) refers to the point at which the gain of the amplifier drops by 1 dB below the small signal gain (the gain at very small input power levels).

Adaptive Filtering and Decision Feedback Equalizers

Adaptive filtering is a common and powerful function that finds use in a large variety of applications. One application is the basic communication problem, in which information is sent from one place to another. When an applied filter is used to compensate for the effects of the channel across which the information was sent, it is typically referred to as an equalizer.

One source of error in information transmission is intersymbol interference (ISI), which arises when a signal is sent across a dispersive channel. Dispersive channels tend to spread the energy of a transmitted signal out over time, so that both past and future symbols can interfere with the current symbol.

To further illustrate this point, consider a transmitted signal, t, which is sent across a dispersive channel with impulse response h. The received signal, x, is given by Equation 1.

$$x_k = \sum_n h_n t_{k-n}$$

$$= h_0 t_k + \sum_{n<0} h_n t_{k-n} + \sum_{n>0} h_n t_{k-n}$$

Eq. 1

The second term in Equation 1 arises from the precursor component of the channel impulse response, and models interference from future symbols with the current symbol. The third term in Equation 1 arises from the postcursor component of the channel impulse response, and models interference from previous symbols with the current symbol. Equalization techniques can be used to reduce or remove these components.

Oftentimes, prior knowledge of the channel characteristics is not known, making it difficult to define a relatively good, such as an optimum filter. To overcome this problem, filters are often made adaptive, allowing the filters to "learn" the channel characteristics.

Adaptive Transversal Filters

The adaptive transversal filter is a typical component in adaptive equalization applications, and is a well-understood non-recursive structure. It operates in the discrete time domain and has a finite impulse response (FIR). A generalized block diagram of the adaptive transversal filter is shown in FIG. 2.

For convenience, the input history and coefficients are expressed as vectors in Equations 2 and 3.

$$X_k = [x_k \, x_{k-1} \ldots x_{k-N}]^T \qquad \text{Eq. 2}$$

$$W_k = [W0_k \, W1_k \ldots WN_k]^T \qquad \text{Eq. 3}$$

Coefficient adaptation is performed based on the desired response, $d_k$, and the filter output, $y_k$. $d_k$ is often a training (pilot) signal, which can be a copy of the transmitted sequence stored in the receiver, or the hard decisions of a Decision Feedback Equalizer (DFE). Commonly used adaptation algorithms attempt to minimize the mean-square error, $E[\epsilon_k^2]$, where the error signal is given by Equation 4.

$$\epsilon_k = d_k - y_k = d_k - W_k^T X_k \qquad \text{Eq. 4}$$

Equation 5 expands the square of the error signal.

$$\epsilon_k^2 = (i_k - W_k^T X_k)^2$$

$$= d_k^2 + W_k^T X_k X_k^T W_k - 2 d_k X_k^T W_k \qquad \text{Eq. 5}$$

To produce a reasonably simplified expression for the mean-square error, several assumptions can be made: $W_k$ is fixed; and $X_k$, $d_k$, and $\epsilon_k$ are statistically wide-sense stationary. With these assumptions, the mean-square error is reduced as shown in Equation 6.

$$E[\epsilon_k^2] = E[d[k]^2] + W^T E[X_k X_k^T] W - 2 E[d[k] X_k^T] W \qquad \text{Eq. 6}$$

From Equation 6, it is clear that the mean-square error is a quadratic function of the coefficient vector W. This quadratic function is referred to as the error surface, and it contains a global minimum at the optimal coefficient vector. In one embodiment, a task of the adaptation engine is to walk the coefficients down the error surface to a point as close as possible to the optimal solution.

There are a large variety of basic algorithms available to converge the coefficient vector to the optimal solution, including Newton's method, the steepest descent method, least-mean square (LMS), and recursive least squares (RLS). LMS is one of the most commonly used algorithms due to its ease of computation. LMS achieves its simplicity by approximating the mean-square error, $E[\epsilon_k^2]$, with $\epsilon_k^2$, leading to the following coefficient update equation expressed in Equation 7.

$$W_{k+1} = W_k + \mu \epsilon_k X_k \qquad \text{Eq. 7}$$

In Equation 7, $\mu$ is a step-size scalar that can be used to control convergence rate and steady-state accuracy.

In the above illustrative description, the filter and associated algorithms operate on real-valued data. The extension to complex-valued data and coefficients is well known in the art and is included in the scope of the present disclosure. Similarly, in the illustrated description, an optimal coefficient vector is typically chosen as the one that minimizes the mean square error between the filter output and the desired response.

Blind Equalization

When the desired response, $d_k$, is unknown, adaptation should be done in blind mode. There are many algorithms capable of blindly converging for an adaptive filter, and they make use of higher-order statistics of the filter's input. Some prominent algorithms include Sato's algorithm and the Constant Modulus Algorithm (CMA).

Decision Feedback Equalizers

An alternative to the feedforward transversal filter, known as the Decision Feedback Equalizer (DFE), was originally proposed by Austin in 1967 and showed superior performance to its linear counterpart. It was later modified by George et al. (1971) to be adaptive. Adaptive DFEs typically use adaptive transversal filters in both feedforward and feedback roles (although the feedforward section is not mandatory), as shown in FIG. 3.

The role of the feedforward section is to reduce the precursor component of the ISI, while the feedback section reduces the postcursor component. In a traditional symbol-rate DFE, precursor and postcursor components spaced at integer multiples of the symbol period are corrected. For example, a DFE with N feedback taps can correct for postcursor components that occur at spacings of T, 2T, . . . , NT from the current symbol.

DFEs can be implemented in analog or in digital form. A digital implementation uses analog-to-digital conversion of the filter's input signal.

DFEs are often operated in decision-directed mode, which uses the output of the decision device as the desired signal. In this case, the error signal is given by the difference between the decision device's output and input. This is advantageous, as it does not require a training signal to converge the adaptation engine, although convergence can be more difficult. A block diagram for a decision-directed DFE is illustrated in FIG. 4.

In FIG. 4, a common error signal and adaptation engine are used to adapt both the feedforward and the feedback sections. The generation of this error signal can be challenging, as in an analog implementation, it is typical to sample and hold and then scale the soft decisions (input of the decision device) before subtracting them from the hard decisions (output of the decision device). This ensures that the delay through the decision device is accounted for, and also prevents the hard decisions from swamping the small signal level of the soft decisions.

Fractionally Spaced Equalizers

Fractionally Spaced Equalizers (FSEs) are transversal equalizers (used as a linear equalizer or the feedforward portion of a DFE) whose taps are spaced at some fraction of the symbol period. A typical choice is T/2 spacing, which allows correction of both the in-phase instant and the quadrature instant in the channel impulse response.

For an ideal, jitter-free sampling clock, equalization of anything but the ideal in-phase sampling instant provides no improvement in performance. However, when a realistic, jittered clock is considered, the true sampling instant slides around the ideal point. Because of this, there is advantage in providing equalization across more of the symbol period. In real-word systems, FSEs provide superior performance to symbol-rate equalizers.

RAM-DFEs store a list of feedback correction values in a table which is indexed by the pattern history. These have been used primarily in disk-drive applications. There does not appear to be a prescribed technique associated with RAM-DFEs for programming or indexing the table of coefficients to overcome BER degradations due to nonlinearities in an amplifier, such as a variable gain amplifier.

Yungsoo Kim et al., in "A Decision-Feedback Equalizer with Pattern-Dependent Feedback for Magnetic Recording Channels", IEEE Transactions on Communications, Volume: 49, Issue: 1, pg. 9-13, January 2001, describes a RAM-DFE that attempts to address pattern dependent nonlinearities, but in complex and different way than the techniques disclosed herein. Kim's paper describes a method that is not based on feedforward information supplied by a preceding VGA, but rather solely on information internal to the DFE.

Many attempts have also been made on the transmit side to improve linearity. This has been done with analog feedback techniques (e.g., Cartesian feedback, polar feedback, dynamic biasing), digital feedback techniques (e.g., pre-distortion), and amplifier design (e.g., use of highly linear Class A structures).

The negative impact of nonlinearities on the Bit Error Rate (BER) of digital communication systems is well known. Several methods have already been developed to reduce the sensitivity of a digital communications system to nonlinearities in the signal path. These include, but are not limited to, predistortion, Cartesian feedback, and the design of composite amplifiers. Most of these solutions are targeted towards the transmit side of the link.

One relatively common situation found in a digital communication receiver is illustrated in FIG. 5. In FIG. 5, the VGA represents a variable gain amplifier, the AGC represents an automatic gain control block, and the DFE represents a decision feedback equalizer. Despite its apparent complexity, FIG. 5 is relatively simple to understand. The VGA amplifies the incoming RX signal to a desired level. The AGC feedback loop ensures the correct amount of gain is applied by the VGA. The DFE is a filter that helps remove inter-symbol interference (ISI) from the incoming signal.

The VGA can be a major source of nonlinearity in the receiver. One particularly common form of nonlinearity in a VGA is compression, which is often described using the 1 dB compression point (the signal power level at which the gain of the VGA drops by 1 dB).

Oftentimes, the incoming signal can have a large peak-to-average ratio (PAR), as a result of the modulation scheme, ISI, or some other phenomenon. To avoid degradations in BER associated with nonlinearities, the VGA is backed off from its 1 dB compression point. Generally speaking, one of two scenarios results: 1) the implementation of an overly power-hungry/complex VGA, or 2) an unacceptably high BER.

SUMMARY

The disclosed Post-Distortion Decision Feedback Equalizer (PDFE) provides a powerful, yet readily implemented method of overcoming the limitations of nonlinearities in receivers in digital communications systems. These nonlinearities are detrimental to the performance of digital communications systems.

Receivers in digital communications systems are typically constructed of a gain stage (or stages) followed by a filtering stage (or stages). The gain stage is often implemented as a Variable Gain Amplifier (VGA), and can introduce significant nonlinearities, a problem exacerbated by signals with a large peak-to-average ratio (PAR). These nonlinearities, in turn, can cause a degradation in Bit Error Rate (BER).

One embodiment of the invention provides a relatively simple and practical technique of reducing sensitivity to nonlinearities in the VGA. One embodiment uses a modification to both the VGA and the subsequent filtering stage (a DFE). The VGA provides feed forward information regarding its status, and the DFE adjusts its filtering based on that information.

One embodiment is a receiver for receiving a signal having embedded therein symbols, wherein the receiver includes: an input amplifier configured to receive an input signal, wherein the input amplifier is configured to generate an amplified output and a signal strength indicator, wherein the signal strength indicator comprises an indication of a gain nonlinearity of the input amplifier; and a filter operatively coupled to the input amplifier to receive the amplified output and to receive the signal strength indicator, wherein the filter is configured to vary filtering depending on a state of the signal strength indicator, and wherein the filter is configured to determine symbols embedded in the signal. In one embodiment, the input amplifier is a variable gain amplifier (VGA). In one embodiment, the filter is a decision feedback equalizer (DFE).

One embodiment is a method of extracting symbols embedded within a received signal, wherein the method includes: amplifying the received signal in real time with an amplification process to generate an amplified signal; generating an indication of non-linearity of the amplification process; filtering the amplified signal, wherein the filtering varies at least partially based on the indication of non-linearity and on a determined symbol of an earlier symbol period; and slicing the filtered signal to extract symbols.

BRIEF DESCRIPTION OF THE DRAWINGS

These drawings and the associated description herein are provided to illustrate specific embodiments of the invention and are not intended to be limiting.

DETAILED DESCRIPTION OF CERTAIN EMBODIMENTS

Traditional receivers in digital communications systems are often implemented with a variable gain amplifier (VGA) followed by a Decision Feedback Equalizer (DFE). One embodiment of the invention, described herein as a Post-Distortion Decision Feedback Equalizer (PDFE), seeks to alleviate Bit Error Rate (BER) degradations resulting from nonlinearities in the VGA. One aspect of the invention is a reduction in sensitivity to nonlinearities in the VGA. This can allow lower BERs to be achieved, and/or simpler VGA designs to be used.

Post-Distortion Decision Feedback Equalizer (PDFE)

Figure 1:
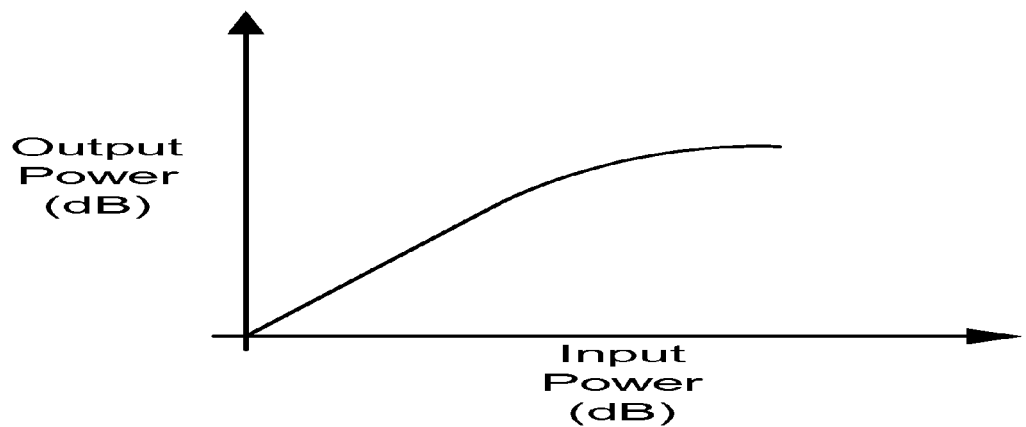
FIG. 1 illustrates the effects of gain compression.
Figure 2:
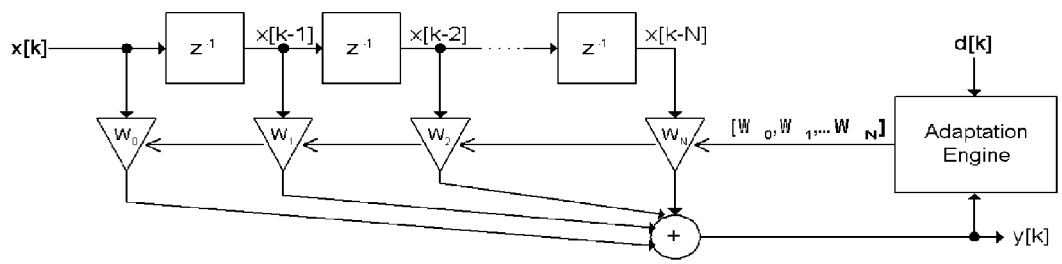
FIG. 2 illustrates an adaptive transversal filter.
Figure 3:
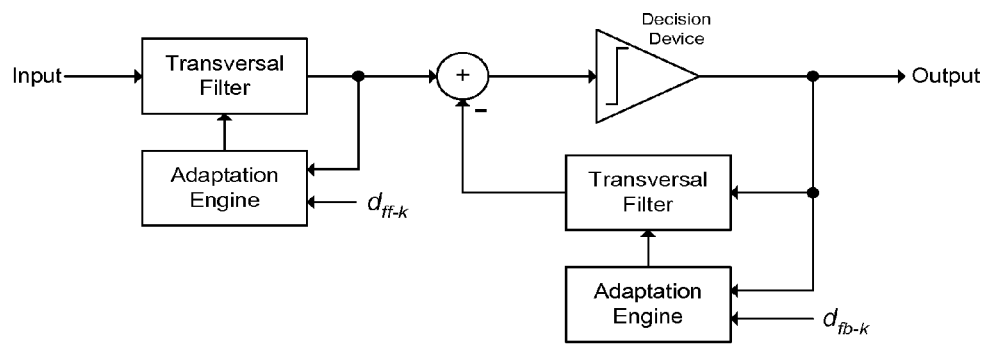
FIG. 3 illustrates an adaptive decision feedback equalizer (DFE).
Figure 4:
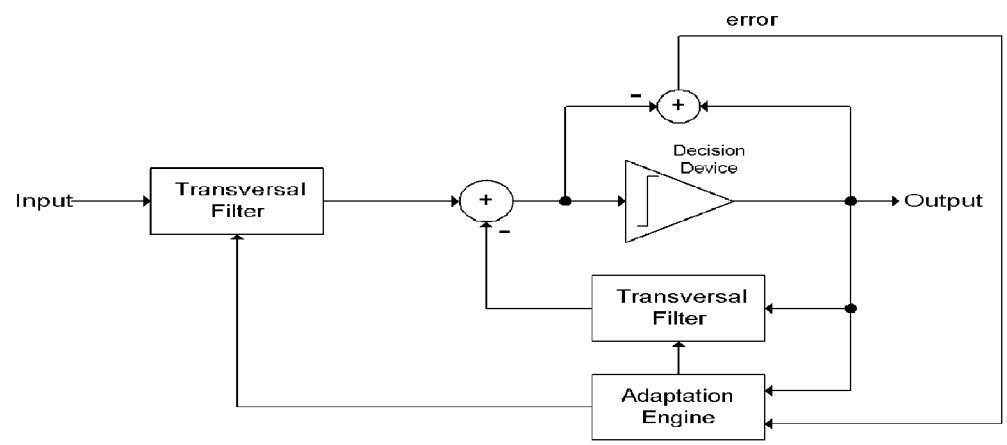
FIG. 4 illustrates a decision-directed DFE.
Figure 5:
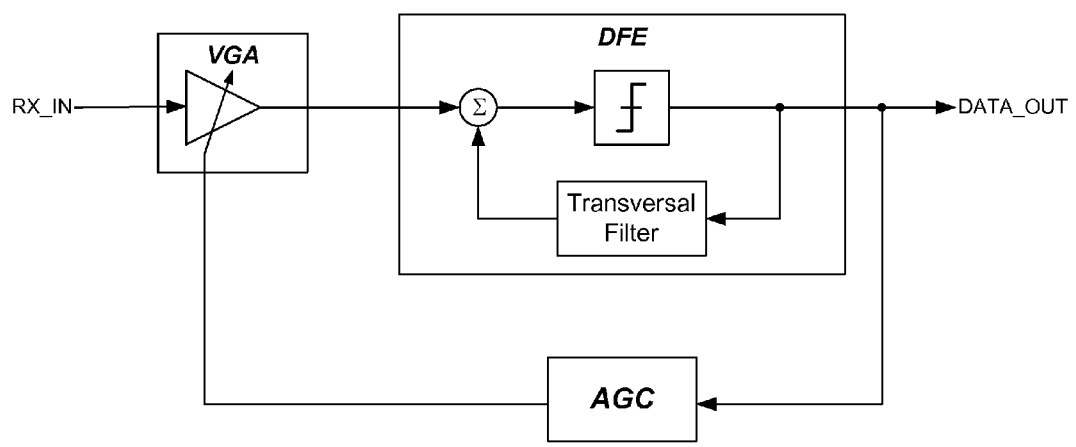
FIG. 5 illustrates a receiver with a variable gain amplifier (VGA), an automatic gain control block (AGC), and a decision feedback equalizer (DFE).
Figure 6:
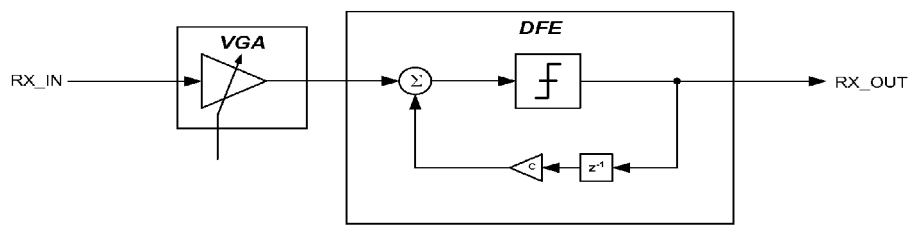
FIG. 6 illustrates a traditional VGA working in tandem with a single-coefficient, traditional DFE with feedback coefficient c.

In one embodiment, the Post-Distortion Decision Feedback Equalizer (PDFE) involves two modifications to the basic structure shown in FIG. 5. One modification is the inclusion of a feedforward signal from the VGA to the DFE. Another modification is to the transversal filter of the DFE. FIG. 6 illustrates a traditional VGA working in tandem with a single-coefficient, traditional DFE with feedback coefficient c.

Figure 7:
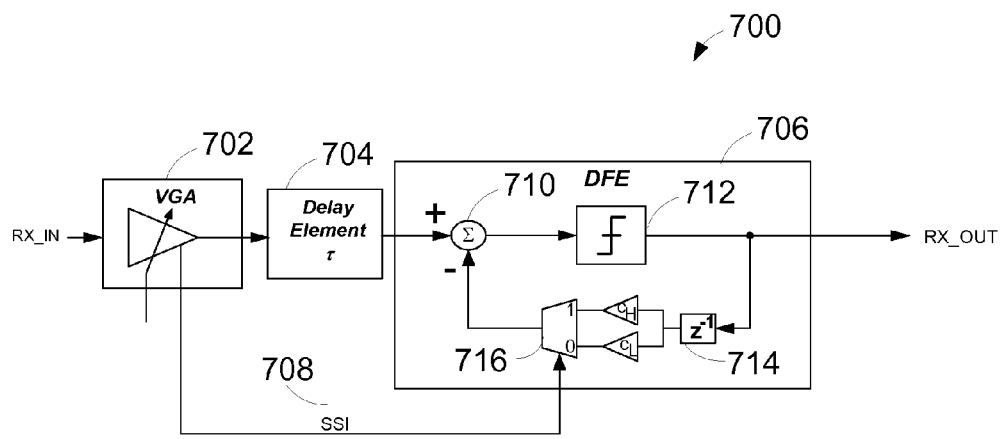
FIG. 7 illustrates one example of a Post-Distortion Decision Feedback Equalizer (PDFE).

FIG. 7 illustrates one example of a Post-Distortion Decision Feedback Equalizer (PDFE) 700. While illustrated in the context of a VGA and a PDFE, the principles and advantages described herein are also applicable to a fixed-gain amplifier and to a transversal filter. The PDFE 700 includes a modified VGA 702, a delay element 704, and a modified DFE 706. A signal strength indicator (SSI) 708 is a feedforward signal used to inform the DFE 706 of the compression status of the VGA 702. The VGA 702 generates such a signal 708. In the simple example shown in FIG. 7, when SSI=logic '1', the VGA 702 has determined that it is compressing the incoming signal RX_IN. The incoming signal RX_IN has symbols embedded within. When SSI=logic '0', the VGA 702 has determined that it is not compressing the incoming signal RX_IN.

An output of the VGA 702 is an amplified output. The amplified output is provided as an input to the delay element 704. An output of the delay element 704 is a delayed amplified output. The delayed amplified output is provided as an input to a summer 710, which is configured to subtract interference from the delayed amplified output that, for example, can be the result of inter-symbol interference (ISI). The feedback signal subtracted from the delayed amplified output is based at least partially on determined symbol(s) (hard) from one or more earlier symbol periods from the slicer 712 and on the SSI signal 708.

Numerous techniques can be used to generate the SSI signal 708. In one embodiment, the amplified output of the VGA 702 is compared to a predetermined threshold. If the amplified output is greater than this threshold, then the SSI signal 708 is set to logic '1'. Otherwise the SSI signal 708 is set to logic '0.' Other techniques will be readily determined by one of ordinary skill in the art.

This SSI signal 708 is utilized by the DFE 706 to select between two coefficient values: $c_H$, which is set to yield relatively good, such as optimum, performance in the presence of signal compression, or $c_L$, which is set to yield relatively good performance in the absence of signal compression (i.e., during relatively linear operation of the VGA 702). This allows the DFE 706 to distinguish between compressed and linear signals, and allows more flexibility in equalizing the received signal. In turn, this facilitates improvements in BER.

In the illustrated embodiment, the DFE 706 comprises a summing circuit 710, a slicer 712, a delay 714, a first path with coefficient $c_H$, a second path with coefficient $c_L$, and a multiplexer 716. The summing circuit 710 subtracts a component from the filtering path (such as from a DFE or a transversal filter) from the received signal as propagated through the VGA 702 and the delay element 704. The slicer 712 receives soft symbols as an input, and generates a hard decision output sequence (hard symbols) as an output. The multiplexer 716 selects between the first path or the second path depending on the state of the SSI signal 708. It will be understood that the DFE 706 can include further coefficients, e.g., further taps for the feedback equalizer.

The delay element 704 is used to provide the DFE 706 with time to react to the SSI signal 708 before it the arrival of the received signal as propagated through the VGA 702. Delay elements are relatively easy to construct in digital implementations. In analog implementations, the delay can be implemented using sample-and-hold circuits, unity gain buffers, or the like. In one embodiment, the VGA 702, the delay element 704, and summer 710 and the input to the slicer 712 are analog, and the rest is digital. In another embodiment, the VGA 702 is analog, and an analog-to-digital converter is disposed in the signal path between the VGA 702, and delay element 704 and the DFE 706 are implemented digitally. The implementation illustrated in FIG. 7 can be extended to be far more complex implementations as will be discussed later.

Post-Distortion Decision Feedback Equalizer (PDFE) Coefficient Adaptation

Figure 8:
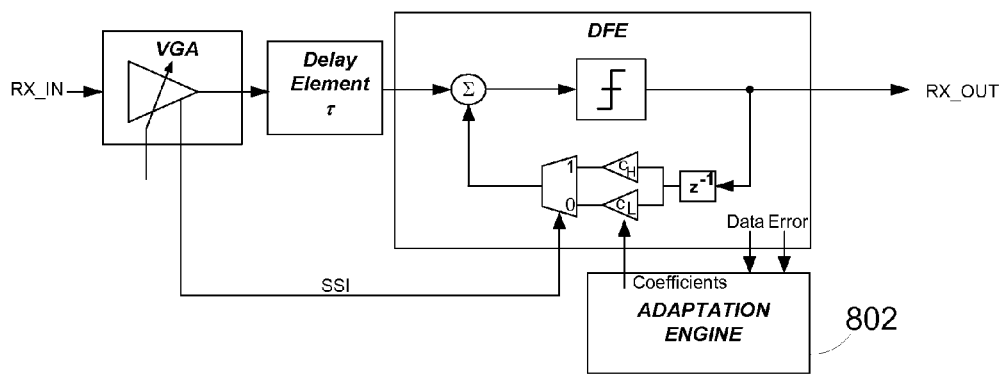
FIG. 8 illustrates an example of a PDFE with an adaptation engine.

As illustrated in FIG. 8, the adaptation of coefficients in the Post-Distortion Decision Feedback Equalizer (PDFE) can be performed by an adaptation engine 802, which can be similar to that used in a traditional DFE.

For the simple, single coefficient case depicted in FIG. 8, the simplest method of adaptation is to allow the adaptation engine to operate as in the case of the traditional DFE. The adaptation engine will arrive at a single coefficient value, which can then be used as $c_L$. Then, coefficient $c_H$ can be determined as a function of coefficient $c_L$. Vice versa is equally valid.

For better performance, coefficients $c_L$ and $C_H$ can be adapted independently. For example, the data and the error inputs to the adaptation engine 802 can also be multiplexed based on SSI. This flexibility can yield further improvements in BER by helping to set the two coefficients closer to the optimum values.

The embodiments described earlier can be extended to include further features. For example, a non-exhaustive list of extensions is given below: (1) Extension to multiple coefficients (n); (2) Extension to allow each coefficient to have more than two possible values, e.g., instead of just $C_L$ and $c_H$, use up to n values: $\{c_i\}$ where $i \in \{0, 1, 2, \ldots n\}$; (3) Extension to allow the SSI signal to be a multi-bit bus (capable of describing multiple regions of operation of the VGA); (4) Extension to filter types besides DFEs, such as transversal filters; (5) Extension to various algorithms for the Adaptation Engine, such as LMS, RLS, and CMA; (6) Extension to allow different adaptation algorithms to be applied to different levels of the coefficients (e.g. the ability to apply LMS to $C_L$, and CMA to $c_H$); (7) Extension to NRZ signaling, RZ signaling, multilevel PAM, duo-binary signaling, Alternate Mark Inversion (AMI), OFDM, and various other modulation schemes; (8) Extension to both analog and digital implementation of all blocks; (9) Extension to fixed filters, i.e., non-adaptive; (10) Extension to fixed-gain amplifiers; (11) Extension to all types of memory-less amplifier nonlinearities, (12) Extension to memory nonlinearities, e.g., expansion. There are two noteworthy advanced embodiments: extension to allow more complex forms of statistical processing of coefficient levels, e.g., using measurements of the probability density function of the VGA output signal to aid in the determination of the relative values of coefficients $c_L$ or $C_H$; and extension to correct memory-type nonlinearities in the VGA.

Figure 9:
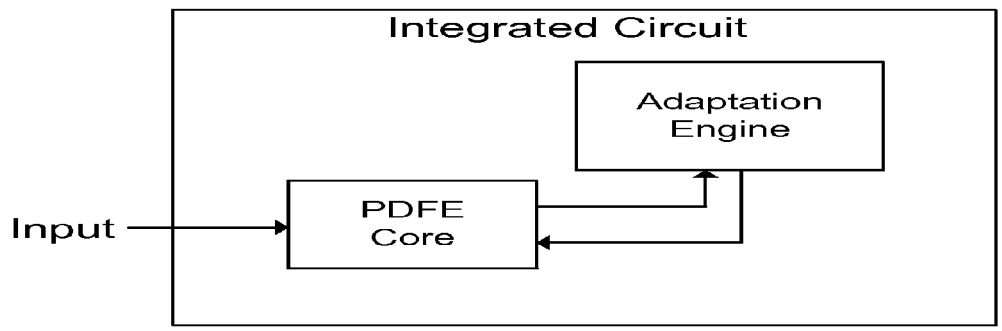
FIG. 9 illustrates an embodiment wherein the PDFE and the adaptation engine are on a single integrated circuit (IC).

The implementations described are not intended to be limiting. FIGS. 9-12 depict the adaptation engine. In the illustrated embodiments of FIGS. 9-12, the block labeled "PDFE Core" includes a gain amplifier, such as a VFA, and a filter, such as a DFE or a transversal filter. FIG. 9 depicts an embodiment of the disclosed invention implemented together with the Adaptation Engine on a single IC. The IC can be, for example, a field programmable gate array, custom application specific integrated circuit (ASIC), or the like.

Figure 10:
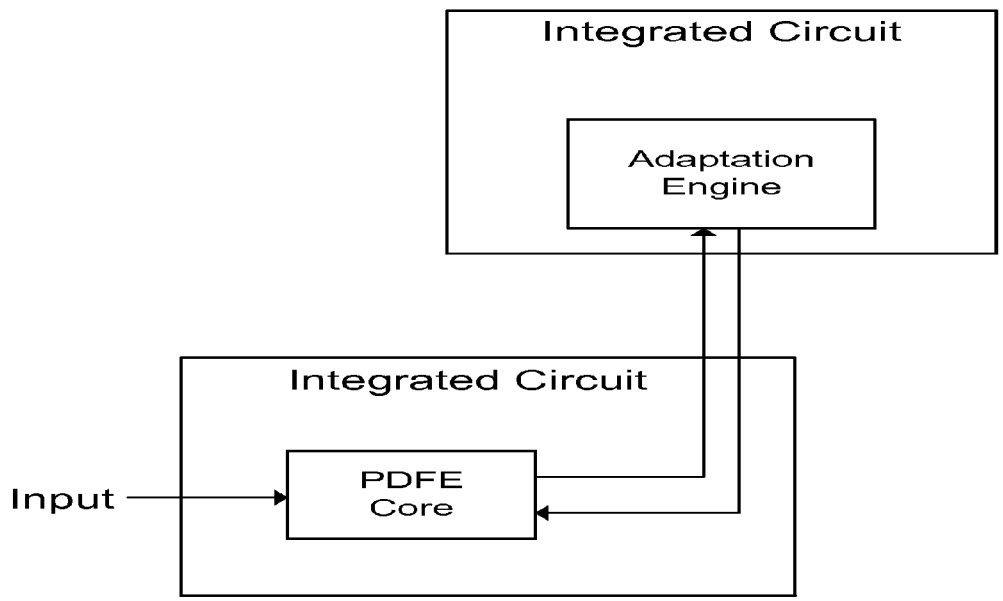
FIG. 10 illustrates an embodiment wherein the PDFE and the adaptation engine are on separate ICs.

FIG. 10 illustrates another hardware-only embodiment shows how the adaptation engine can be placed on a separate IC from the PDFE (each of which could be an FPGA or a custom IC).

Figure 11:
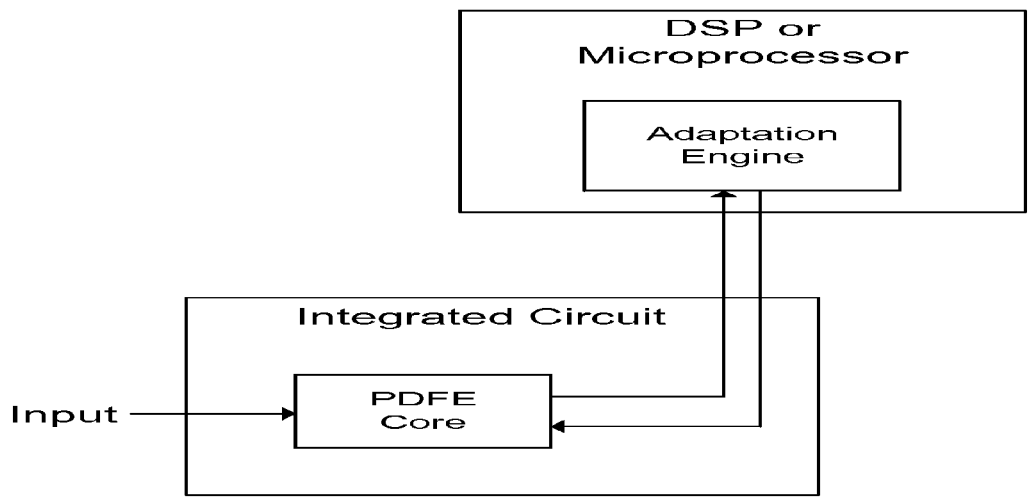
FIG. 11 illustrates an embodiment wherein the PDFE is implemented in hardware, and the adaptation engine is implemented by software or firmware.

FIG. 11 illustrates an embodiment in which the adaptation engine is implemented in software or firmware on a digital signal processor (DSP) or microprocessor. For example, firmware can be executed by the DSP or the microprocessor to implement the adaptation.

Figure 12:
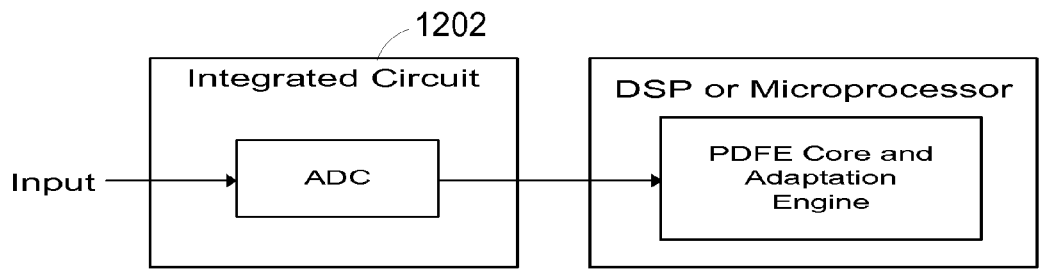
FIG. 12 illustrates an embodiment wherein both the PDFE and the adaptation engine are implemented by software or firmware.

FIG. 12 illustrates an embodiment in which both the adaptation engine and the PDFE are implemented in software or firmware on a DSP or microprocessor. The illustrated embodiment includes an analog to digital converter (ADC) 1202.

Transversal Filter

Figure 13:
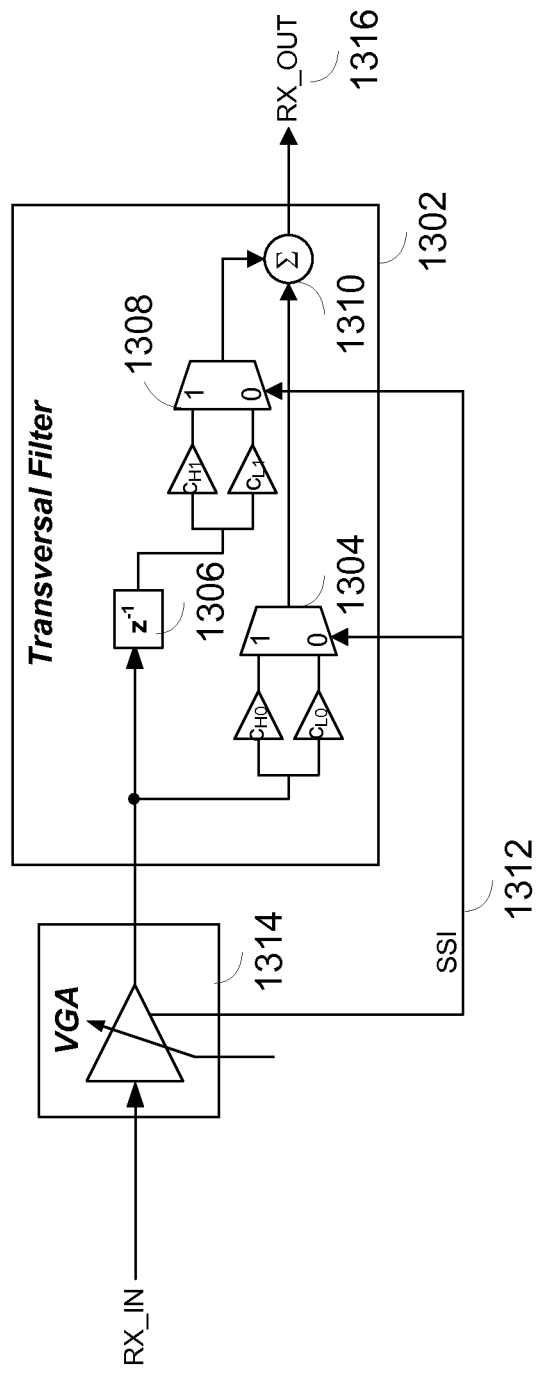
FIG. 13 illustrates a transversal filter in a forward path according to an embodiment of the invention.

FIG. 13 illustrates an embodiment of a transversal filter 1302 according to an embodiment of the invention. The transversal filter 1302 is illustrated in a forward path. The illustrated embodiment corresponds to a single-tap transversal filter. The principles and advantages of the illustrated embodiment can be extended to multiple-tap transversal filters.

The transversal filter 1302 includes first coefficients $c_{h0}$, $c_{l0}$, a first multiplexer 1304, a delay element $z^{-1}$ 1306, second coefficients $c_{h1}$, $c_{l1}$, a second multiplexer 1308, and a summing circuit 1310. The delay element 1306 delays a second path through the second multiplexer 1308 relative to a first path through the first multiplexer 1304.

According to a state of the SSI signal 1312, the multiplexers 1304, 1308 select the appropriate coefficient to apply to the signal as propagated through the VGA 1314 for generation of an output RX_OUT 1316. The outputs of the multiplexers 1304, 1308 are summed by the summing circuit 1310 to generate the output signal RX_OUT 1316.

The principles and advantages described herein can apply to fields using an adaptive algorithm in communications systems. Examples of applications include telecommunications (wireless and wireline), biomedical systems, industrial control, storage media, and the like. For example, in one embodiment, the receiver is embodied in a serializer/deserializer (SerDes).

Various embodiments of the invention have been described in this document. Although this invention has been described with reference to these specific embodiments, the descriptions are intended to be illustrative of the invention and are not intended to be limiting. Various modifications and applications may occur to those familiar with the subject without departing from the true spirit and scope of the invention as defined in the appended claims.

What is claimed is:

1. A receiver for receiving a signal having embedded therein symbols, the receiver comprising:
    an input amplifier configured to receive an input signal, wherein the input amplifier is configured to generate an amplified output and a signal strength indicator, wherein the signal strength indicator comprises an indication of a gain nonlinearity of the input amplifier, wherein the signal strength indicator comprises a control signal; and
    a filter operatively coupled to the input amplifier to receive the amplified output and to receive the signal strength indicator for control, wherein the filter is configured to vary filter coefficients used for filtering depending on a state of the signal strength indicator, and wherein the filter is configured to determine symbols embedded in the signal;

wherein the filter further comprises a multiplexer coupled to the signal strength indicator for control, wherein the multiplexer is configured to vary a feedback path to vary the filter coefficients.

2. The receiver of claim 1, wherein the filter is downstream of the input amplifier.

3. The receiver of claim 1, further comprising a delay element disposed in a signal path between the amplified output of the input amplifier and an input to the filter.

4. The receiver of claim 1, further comprising an adaptation engine coupled to the filter for adaptive control of filter coefficients.

5. The receiver of claim 4, wherein the adaptation engine is configured to adapt a filter coefficient for a state of the signal strength indicator, and is further configured to determine one or more other filter coefficients based at least partially on the adapted filter coefficient for the state.

6. The receiver of claim 4, wherein the adaptation engine is configured to adapt filter coefficients for each state of the signal strength indicator independently.

7. The receiver of claim 1, wherein the input amplifier is configured to generate the signal strength indicator in more than a binary number of states.

8. The receiver of claim 1, wherein the filter comprises a transversal filter.

9. The receiver of claim 1, wherein the input amplifier comprises a variable gain amplifier.

10. The receiver of claim 1, wherein the input amplifier comprises a fixed-gain amplifier.

11. The receiver of claim 1, wherein the nonlinearity comprises compression.

12. The receiver of claim 1, wherein the nonlinearity comprises expansion.

13. The receiver of claim 1, wherein the receiver is embodied in a seralizer/deserializer.

14. The receiver of claim 1, wherein the nonlinearity comprises memory-less effects.

15. The receiver of claim 1, wherein the nonlinearity comprises memory effects.

16. The receiver of claim 1, wherein the input amplifier is configured to generate the signal strength indicator such that the signal strength indicator indicates a presence or absence of at least a threshold amount of gain nonlinearity.

17. The receiver of claim 1, wherein the input amplifier is configured to receive the input signal as a wireless signal.

18. The receiver of claim 1, wherein the input amplifier is configured to receive the input signal as a wired signal.

* * * * *